US006728948B1

(12) United States Patent
Baxter et al.

(10) Patent No.: US 6,728,948 B1
(45) Date of Patent: Apr. 27, 2004

(54) OBJECT ORIENTED FRAMEWORK MECHANISM AND METHOD FOR PROVIDING A GENERIC ORDER ENTRY PROCESSING INTERFACE FOR ONE OR MORE ORDER FULFILLMENT SYSTEMS

(75) Inventors: Randy Dee Baxter, Rochester, MN (US); James Edward Carey, Rochester, MN (US); Brent Allen Carlson, Rochester, MN (US); Timothy James Graser, Rochester, MN (US); Vincent Edmund Price, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/488,659

(22) Filed: Jan. 20, 2000

(51) Int. Cl.$^7$ ................................................ G06F 9/44
(52) U.S. Cl. ........................ 717/108; 717/102; 717/116; 705/26
(58) Field of Search ................................ 717/100–118; 705/26–30, 79

(56) References Cited

U.S. PATENT DOCUMENTS 5,936,860 A * 8/1999 Arnold et al. .............. 364/468
6,049,665 A * 4/2000 Branson et al. ............ 395/702
6,163,772 A * 12/2000 Kramer et al. ................ 705/79
6,173,439 B1 * 1/2001 Carlson et al. ............. 717/118

* cited by examiner

Primary Examiner—Tuan Q. Dam
(74) Attorney, Agent, or Firm—Martin & Associates L.L.C.; Derek P. Martin

(57) ABSTRACT

An object oriented framework defines a generic order processing interface that creates an order, and that processes the order and generates requests to one or more fulfillment systems to fill the order. The generic order suitably includes one or more line items. One or more extensible interface classes are provided in the framework, which allows a user to define the order entry protocol for the relevant order fulfillment systems. Once properly extended, the framework is used to generate an executable framework application, which allows a client to enter a generic order, and which then generates the appropriate requests to fill the order with the appropriate order fulfillment system or systems. The framework of the preferred embodiments thus allows the specific knowledge of the back-end order fulfillment systems to be isolated to the extended portions of the framework, while the front-end order entry system has no knowledge of the order fulfillment systems that may be called upon to fill an order. The framework of the present invention thus allows adding a new order fulfillment system by simply extending the framework to define the attributes of the new fulfillment system without making changes to the core portion of the framework that governs how generic orders are processed.

19 Claims, 7 Drawing Sheets

OBJECT ORIENTED FRAMEWORK MECHANISM AND METHOD FOR PROVIDING A GENERIC ORDER ENTRY PROCESSING INTERFACE FOR ONE OR MORE ORDER FULFILLMENT SYSTEMS

BACKGROUND OF THE INVENTION

1. Technical Field

This invention generally relates to the data processing field. More specifically, this invention relates to the field of order processing using computers.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems have become widely used to process orders for goods and services. When a company sells products that it manufactures, an order fulfillment system is often used to enter and process orders so that goods and services may be delivered to the customer in an efficient manner. The hardware and software configurations of order fulfillment systems that are currently being used is vast and diverse, and are typically custom-programmed for a company's particular needs and products.

Some companies market products that they do not themselves manufacture. For example, catalog companies may have several items that they do not stock, but instead place an order to a manufacturer or distributor when a customer places an order for that item. For example, let's assume that a customer in browsing a catalog decides to place an order for a suitcase, a baseball cap, and four pairs of socks. Let's further assume that each of these products is available from different manufacturers or distributors (also referred to herein as "product providers"). Prior art systems require that the customer's order be parsed into three separate orders, one for each product provider. However, the order fulfillment system for each of these product providers is likely very different, so each order must be customized to comply with the protocol for ordering from that product provider. Let's assume for our example that the suitcase is available from Company A, which we assume has an automated order fulfillment system implemented using the SanFrancisco framework available from IBM. Let's further assume that the baseball cap is available from Company B, which also has an automated order fulfillment system implemented using SAP software. Let's also assume that the socks are available from Company C, which has a manual order fulfillment system that requires that orders are placed via facsimile (fax). With these assumptions, the single order is manually parsed into three separate orders that comply with the order entry protocol for each order fulfillment system. This requires that the order entry system have intimate knowledge regarding the order processing details for each potential order fulfillment system. For a catalog company, the number of different fulfillment systems can be very large, and can constantly change as products are added to or deleted from the catalog. Without a an order entry mechanism that presents a uniform order entry interface and that processes orders by automatically generating orders for each selected order fulfillment system, the computer industry will continue to suffer the drawbacks of extensively revising the computer code for order fulfillment systems when additions, deletions, or changes to order fulfillment systems are made.

DISCLOSURE OF INVENTION

According to the preferred embodiments, an object oriented framework defines a generic order processing interface that creates an order, and that processes the order and generates requests to one or more fulfillment systems to fill the order. The generic order suitably includes one or more line items. One or more extensible interface classes are provided in the framework, which allows a user to define the order entry protocol for the relevant order fulfillment systems. Once properly extended, the framework is used to generate an executable framework application, which allows a client to enter a generic order, and which then generates the appropriate requests to fill the order with the appropriate order fulfillment system or systems. The framework of the preferred embodiments thus allows the specific knowledge of the back-end order fulfillment systems to be isolated to the extended portions of the framework, while the front-end order entry system has no knowledge of the order fulfillment systems that may be called upon to fill an order. The framework of the present invention thus allows adding a new order fulfillment system by simply extending the framework to define the attributes of the new fulfillment system without making changes to the core portion of the framework that governs how generic orders are processed.

The foregoing and other features and advantages of the invention will be apparent from the following more particular description of preferred embodiments of the invention, as illustrated in the accompanying drawings.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

Figure 1:
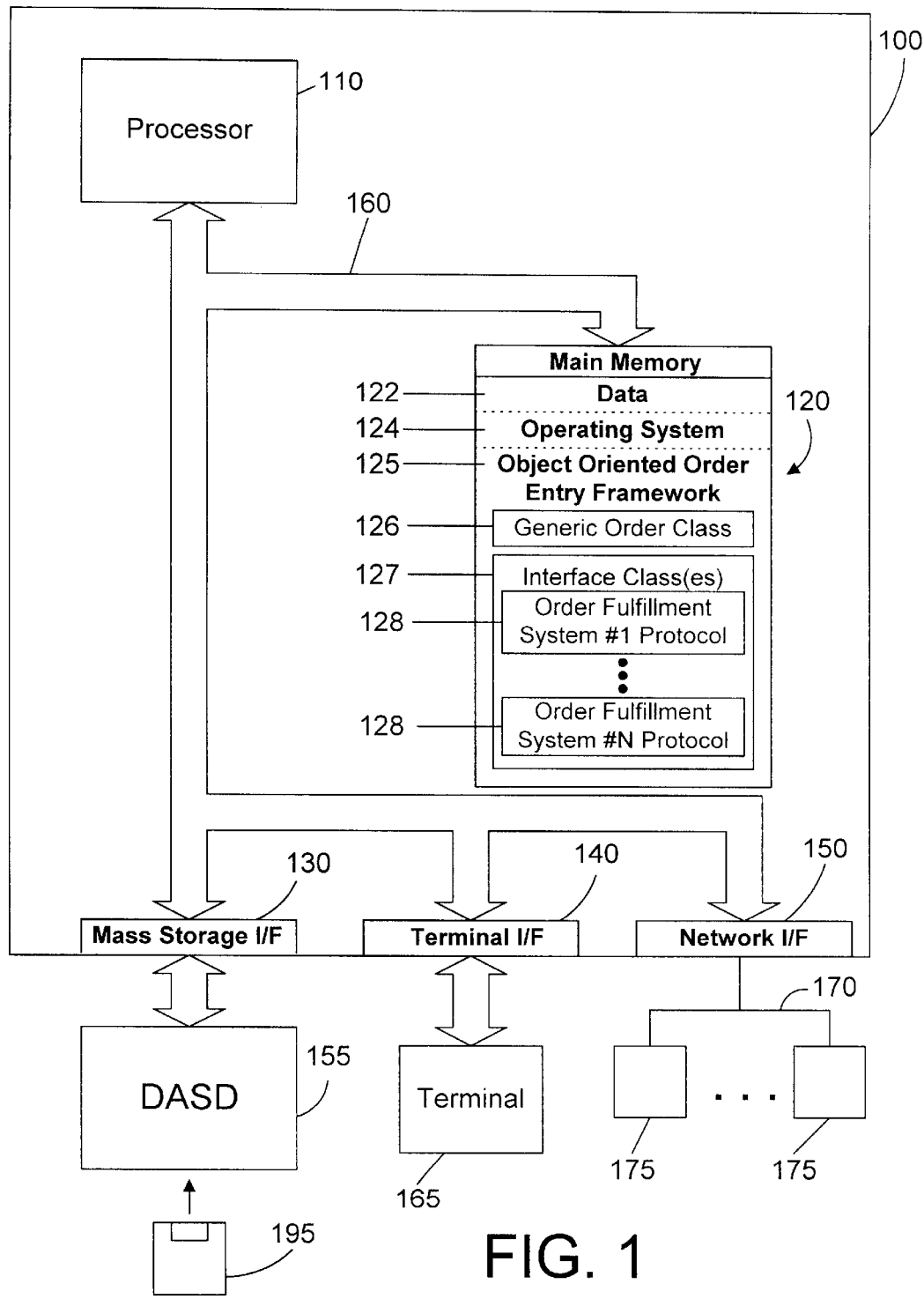
FIG. 1 is a block diagram of a computer system according to a preferred embodiment of the present invention.

The present invention relates to object oriented programming techniques. For those individuals who are not generally familiar with object oriented programming, the Overview section below presents many of the concepts that will help to understand the invention.

1. Overview
Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Objects can be thought of as autonomous agents that work together to perform certain tasks. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object—server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code.

There are many computer languages that presently support object oriented programming techniques. For example, Smalltalk, Object Pascal, C++ and Java are all examples of programming languages that support object oriented programming to one degree or another.

The goal of using object oriented programming is to create small, reusable sections of program code known as objects that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a group of well-tested objects, a more stable, uniform, and consistent approach to developing new computer programs can be achieved.

Although object oriented programming offers significant improvements over other programming types, program development still requires significant amounts of time and effort, especially if no preexisting objects are available as a starting point. Consequently, one approach has been to provide a program developer with a set of pre-defined, interconnected classes that create a set of objects. Such pre-defined classes and libraries are typically called object frameworks. Frameworks essentially provide a prefabricated structure for a working program by defining certain classes, class relationships, and methods that a programmer may easily use by appropriate subclassing to generate a new object oriented program.

The Term Framework

There has been an evolution of terms and phrases which have particular meaning to those skilled in the art of OO design. However, the reader should note that one of loosest definitions in the OO art is the definition of the wordframework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser (referred to herein as a "user"). The extensible function, on the other hand, is that part of the framework mechanism that has been explicitly designed to be customized and extended by the user. Note that the term "core function" is described in the specification and claims as functions that cannot be modified by a user. However, because a function is a core function does not mean that a user is somehow prevented from modifying it. A user could use class replacement, for example, to replace core classes in a framework. However, the design of the framework intends that certain classes and class relationships remain undisturbed by the user, and these functions comprise the "core functions" of a framework. Thus, when core functions are described in a way that they "cannot be modified by a user", this means that the core functions cannot be modified by a user within the design parameters of the framework.

Object Oriented Frameworks

Object oriented frameworks are prefabricated structures of classes and class relationships that allow a programmer to extend the framework to build an object oriented program that performs desired functions. While in general terms an object oriented framework can be properly characterized as an object oriented ("OO") solution, there is nevertheless a fundamental difference between a framework and a traditional OO program. The difference is that frameworks are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of replacing or reworking an existing solution.

Therefore, when framework designers set out to solve a particular problem, they do more than merely design individual objects and how those objects interrelate. They also design the core function of the framework (i.e., the part of the framework that should not be subject to potential customization and extension by the framework consumer) and the extensible function of the framework (i.e., that part of the framework that is to be subject to potential customization and extension.). Frameworks are mentioned here as one possible type of OO program that could benefit from the invention disclosed herein.

IBM's SanFrancisco Framework

IBM introduced a framework product known as "SanFrancisco" that provides a framework for programming business applications, such as a general ledger or order processing application. SanFrancisco provides a set of base services such as persistence and transaction support as well as a set of common business objects such as currency and business partner. Above the base layer, SanFrancisco provides frameworks that define the basis of an application such as a general ledger or order management with well-defined extension points. A user may take advantage of the power and flexibility of SanFrancisco by providing user-defined extensions that customize SanFrancisco for a particular application. SanFrancisco thus provides a "short cut" to custom programming an entire application by providing pre-packaged code that is easily extended by a user to provide a custom application.

The SanFrancisco framework provides extension points that allow a user to customize the framework according to the user's needs. One specific type of extension point is a "policy", which is a way for a user to define how the framework behaves. For example, an ExchangeRatePolicy class would allow the user to extend this class to define the specific algorithm used to calculate exchange rates.

Version 1.4.4 of the SanFrancisco framework provides order processing capabilities, but does not allow processing an order and automatically submitting orders to multiple order fulfillment systems in their correct order entry protocols. The present invention extends the capabilities of the previous SanFrancisco framework by providing core functions that define a generic order entry interface and extensible functions that allow a user to specify different order fulfillment systems and their respective order entry protocols.

Notation

There is, as yet, no uniformly accepted notation for communicating object oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

2. Detailed Description

An object oriented framework mechanism and method in accordance with the preferred embodiments provides a generic order entry interface that is a core function of the framework and thus cannot be modified by a user, and provides extensible interface objects that define an order fulfillment system and its associated order entry protocol. Once extended, the framework mechanism is used to generate an executable framework application, which allows orders to be entered via the generic order interface, and which processes those orders and automatically submits, as required, requests to one or more order fulfillment systems. The advantages of the present invention are presented below in conjunction with the description of the preferred embodiments.

Referring to FIG. 1, a computer system 100 in accordance with the preferred embodiment is an IBM AS/400 computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Main memory 120 in accordance with the preferred embodiments contains data 122, an operating system 124, and an object oriented order entry framework mechanism 125. Order entry framework mechanism 125 includes a generic order class 126 and an interface class 127. Generic order class 126 defines a generic order, which preferably comprises one or more order line items. In the preferred embodiments, the generic order class 126 is a core class of the framework 125, and thus cannot be modified by a user. GenericOrder class 126 provides a generic order entry interface. The term "generic order entry interface" as used herein does not refer to a user interface, such as a graphical user interface (GUI) for entering orders, but instead refers to a class (e.g., GenericOrder) or classes that have a predefined interface that cannot be changed by a user for creating orders.

Interface class(es) 127 represents one or more extensible classes of the framework 125. A user extends one or more interface classes 127 to define one or more order fulfillment system protocols 128. Each order fulfillment system protocol 128 defines how an order is submitted to a particular order fulfillment system. By encapsulating the core function of framework 125, the framework 125 provides a uniform generic order processing interface that may be easily extended to communicate with any number of fulfillment systems by appropriately defining the order fulfillment system protocols for each specified order fulfillment system in extensions to framework 125.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, and framework 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
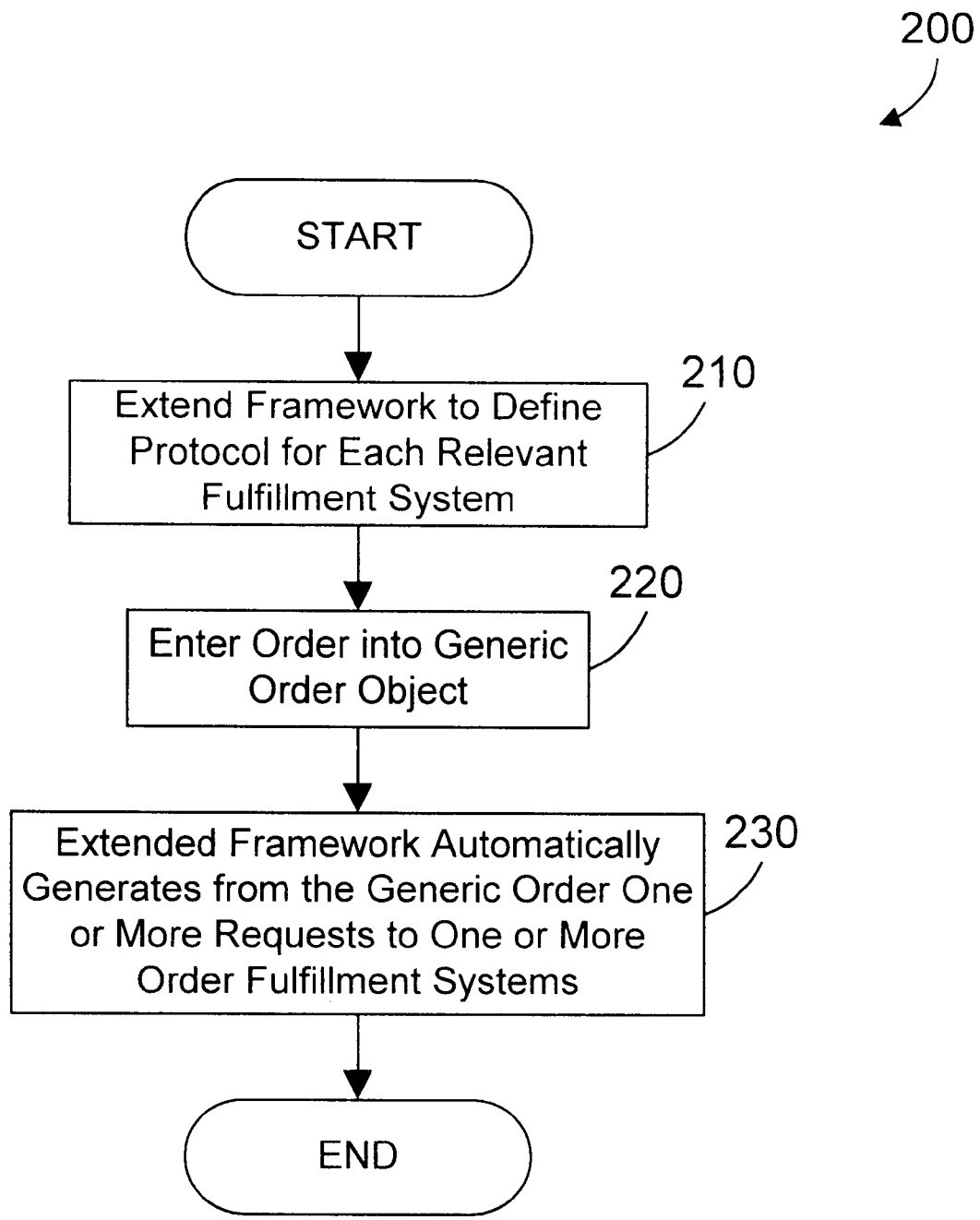
FIG. 2 is a flow diagram of a method for entering and processing orders in accordance with the preferred embodiments.

Referring to FIG. 2, a method 200 for processing orders in accordance with the preferred embodiments begins by extending the framework 125 of FIG. 1 to define the order entry protocols 128 for one or more order fulfillment systems (step 210). For the example given in the Background section of an order that includes products provided by fulfillment systems of IBM SanFrancisco's order management, SAP, and a fax, the order entry protocol for each of these three order fulfillment systems is defined in step 210 so that the framework knows how to submit orders to the order fulfillment systems that provide these products. Next, an order is entered into a generic order object defined by the framework (step 220). In response, the framework automatically generates from the generic order one or more request to one or more order fulfillment systems (step 230). For the example above, this means that a request will automatically be submitted to Company A for the suitcase in a format that the Company A order fulfillment system expects (i.e., that is compatible with its SanFrancisco framework order fulfillment system); a request will automatically be submitted to Company B in a format that the Company B order fulfillment system expects (i.e., that is compatible with its SAP order fulfillment system); and a request will automatically be submitted to the Company C order fulfillment system via fax. In this manner the framework of the preferred embodiments provides a common generic order entry interface that may be used regardless of the specific order fulfillment system or systems that are sent requests to fill the order.

Figure 3:
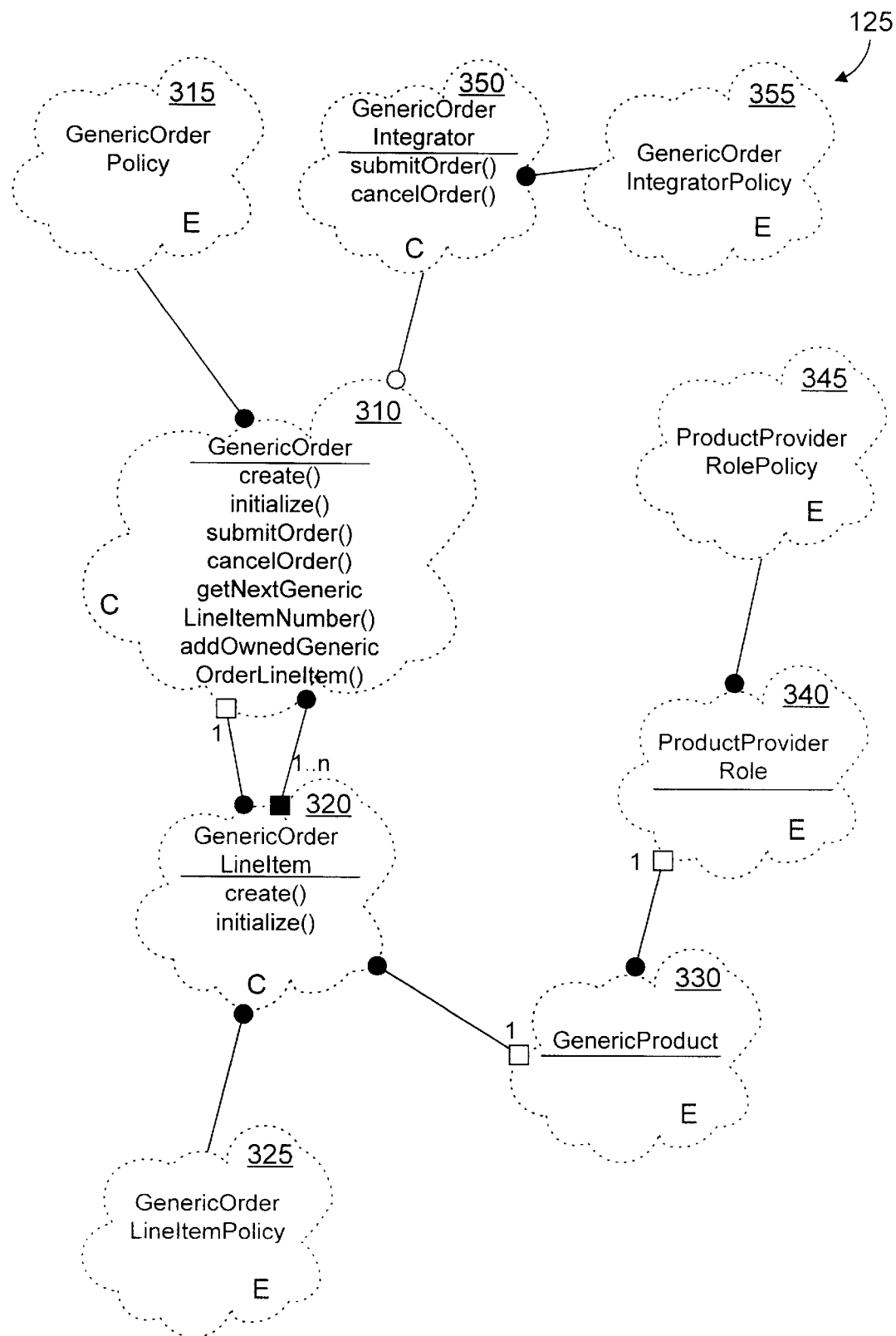
FIG. 3 is a class diagram showing classes that may be used to implement the framework of FIG. 1.

Referring now to FIG. 3, a class diagram represents one suitable implementation of a portion of framework 125 in accordance with the principles of the preferred embodiments. A GenericOrder class 310 is defined, which represents a generic, consistent format for orders. The GenericOrder class is a core class of the framework, as designated by the "C" legend on the left side of the class symbol. This means that a user cannot change the implementation of the GenericOrder class. GenericOrder defines a create( ) constructor method that is used to create instances of the GenericOrder class, and an initialize( ) method that is called to initialize a GenericOrder instance after it is created. Other defined methods include: submitOrder( ); cancelOrder( ); getNextGenericLineItemNumber( ); and addOwnedGenericOrderLineItem( ). The submitOrder( ) method is invoked when an order needs to be submitted for fulfillment. The cancelOrder( ) method is invoked when a previously-entered order needs to be canceled. The getNextGenericLineItemNumber( ) method causes a GenericOrder object to retrieve and return the next line item number in the order. The addOwnedGenericOrderLineItem( ) method is used to add a line item to a GenericOrder object.

The GenericOrder class 310 has a "contains by value" relationship with the GenericOrderLineItem class 320, indicating that a GenericOrder includes one or more GenericOrderLineItem objects. In addition, the GenericOrderLineItem class 320 has a "contains by reference" relationship with the GenericOrder class 310 as shown in FIG. 3. The GenericOrderLineItem class 320 defines a create( ) constructor method, and an initialize( ) method that is called to initialize a GenericOrderLineItem object after it is created. The GenericOrderLineItem class 320 is a core class of the framework, which means that this class cannot be modified by a user. The GenericOrder class 310 of FIG. 3 is one suitable implementation in accordance with the preferred embodiments of the generic order class 126 in FIG. 1.

The GenericOrderLineItem class 320 has a "contains by reference" relationship with the GenericProduct class 330, which in turn has a "contains by reference" relationship with the ProductProviderRole class 340. The GenericProduct class 330 represents a product that may be specified in a GenericOrderLineItem object, which is a way to say that a GenericProduct is one item that may be included in a generic order. For the example above, the suitcase, baseball cap, and socks would all be instances of the GenericProduct class 330. The GenericProduct class 330 is an extensible class (indicated by the "E" at the lower right of the GenericProduct class symbol) that allows a user to define subclasses that define the various products that may be ordered.

The ProductProviderRole class 340 is an extensible class that suitably provides object methods that interact with a particular order fulfillment system to perform desired functions. The details of the ProductProviderRole class 340 are shown in more detail in FIG. 4, and are explained more fully below.

The GenericOrder class 310 has a "uses" relationship with a GenericOrderIntegrator class 350. The GenericOrderIntegrator class 350 defines a mechanism that processes the GenericProducts specified in GenericOrderLineItems in a GenericOrder object, and generates for these GenericProducts one or more requests to corresponding order fulfillment systems specified in a ProductProviderRole. GenericOrderIntegrator defines a submitOrder( ) method and a cancelOrder( ) method that allow a GenericOrder object to submit and cancel, respectively, an order, and to generate the requests to the corresponding order fulfillment systems that need to be accessed to fill or cancel the order. The GenericOrderIntegrator class 350 is a core class of the framework 125, which cannot be modified or extended by a user.

The GenericOrder class 310 has a "has" relationship with a GenericOrderPolicy class 315. In similar fashion, the GenericOrderLineItem class 320 has a "has" relationship with a GenericOrderLineItemPolicy class 325; the ProductProviderRole class 340 has a "has" relationship with a ProductProviderRolePolicy class 345; and the GenericOrderIntegrator class 350 has a "has" relationship with a GenericOrderIntegratorPolicy class 355. These policy classes are extension points for the framework 125, and allow the user to specify how each of the corresponding classes perform their functions. The extensible classes in FIG. 3 are specific implementations of "interface classes" 127 shown in FIG. 1. In particular, the ProductProviderRole class 340 and its associated policy classes 345 define objects that specifically correspond to order entry protocols 128 shown in FIG. 1.

Figure 4:
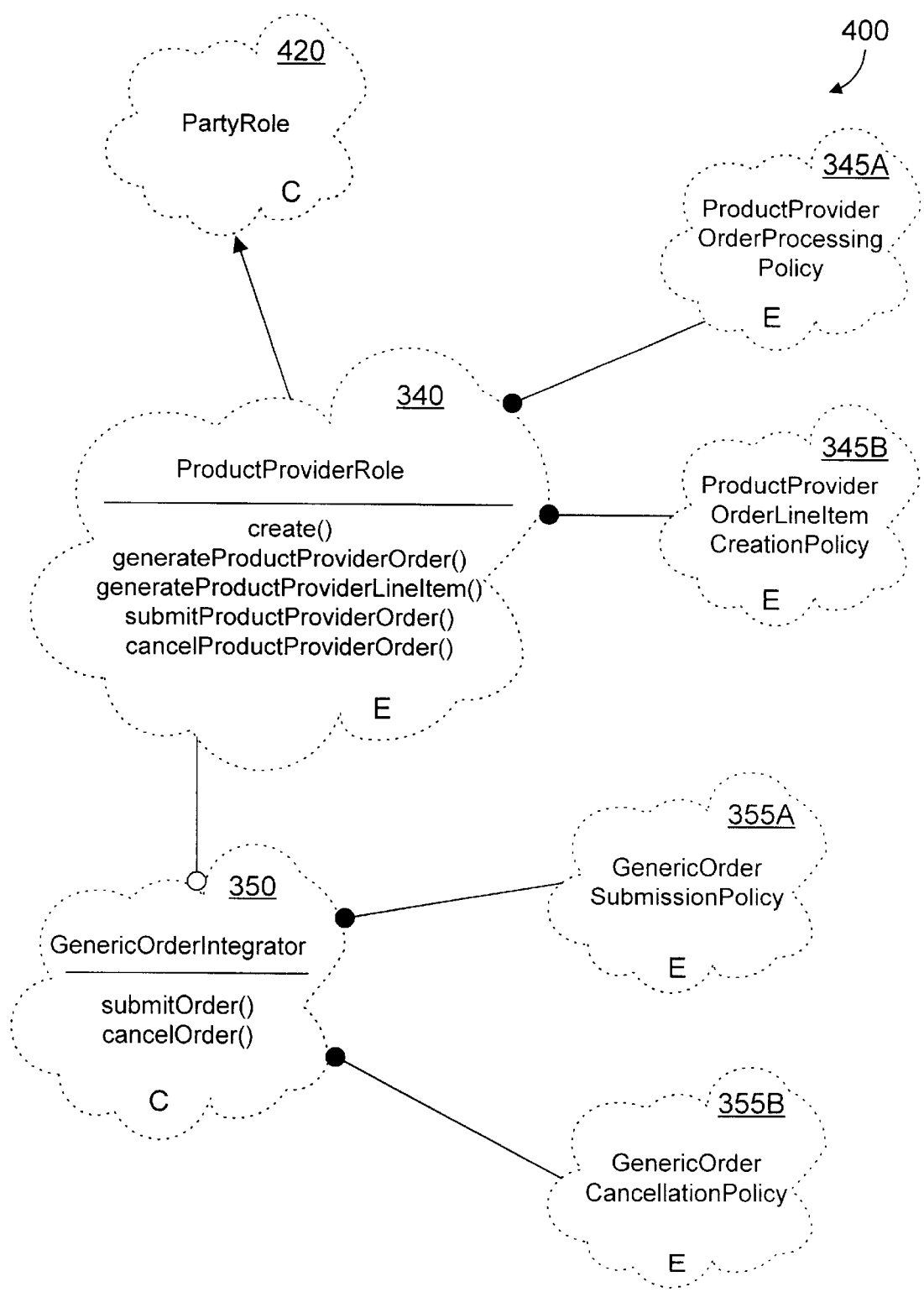
FIG. 4 is a class diagram showing specific implementations of classes for the purpose of illustrating the concepts of the framework of the preferred embodiments.

Examples of the policy classes in FIG. 3 are shown with a more concrete example in FIG. 4. Referring now to FIG. 4, the ProductProviderRole class 340 is shown in greater detail than in FIG. 3. The class diagram of FIG. 4 illustrates one possible implementation that includes specific policy classes in accordance with the preferred embodiments. The ProductProviderRole class 340 is a subclass of a PartyRole class 420, which is a class that allows a party (such as a person, organization, or system) to be assigned a role (such as a product provider). The ProductProviderRole class 340 defines the following object methods: a create( ) constructor method; a generateProductProviderOrder( ) method that is invoked to generate an order (referred to in this example as a ProductProviderOrder( ) in a format compatible with an order entry protocol on a particular order fulfillment system; a generateProductProviderLineItem( ) method that is called to generate a line item in a ProductProviderOrder; a submitProductProviderOrder( ) method that is called to submit the order to the corresponding order fulfillment system; and a cancelProductProviderOrder( ) method that is called to cancel a previously-entered order in the corresponding order fulfillment system.

In the specific example of FIG. 4, the ProductProviderRole has two associated policies, ProductProviderOrderProcessingPolicy 345A, and ProductProviderOrderLineItemCreationPolicy 345B. These policies are concrete examples of the ProductProviderRolePolicy 345 in FIG. 3. In addition, the GenericOrderIntegrator class 350 has two associates policies, namely GenericOrderSubmissionPolicy 355A and GenericOrderCancellationPolicy 355B, which are concrete examples of the GenericOrderIntegratorPolicy class 355 of FIG. 4. These specific policies are used to illustrate the function of framework 125 in the object diagrams of FIGS. 7 and 8.

Figure 5:
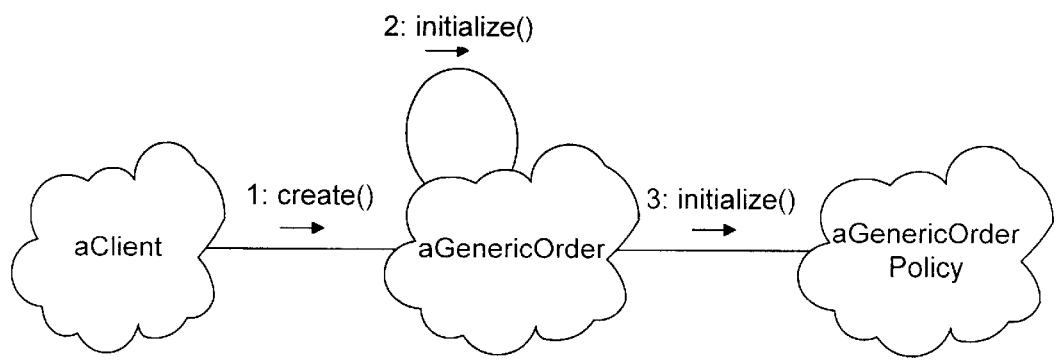
FIG. 5 is an object diagram showing the steps in creating a generic order and its associated policy or policies.

In the following descriptions, the relevant policy objects can be passed as parameters on a call, or a default policy can be located or created if no policy object is supplied as a parameter. Referring now to FIG. 5, an object diagram illustrates the steps in creating a GenericOrder object and one or more associated policy objects. A client program or object first invokes the create( ) constructor method on the GenericOrder class (step 1), which creates an instance of that class. Note that the create( ) method may include numerous parameters that dictate the characteristics of the generic order. Next, the newly-created instance is initialized by invoking the initialize( ) method, passing in as parameters any information that is necessary for its initialization (step 2), which may include information passed as parameters in the create( ) constructor method. At this point the aGenericOrder object has been created and initialized. The aGenericOrder object then determines which policy class is applicable, creates or retrieves an instance of that class, and invokes the initialize( ) method on that new instance (step 3). Step 3 may be repeated for additional policy classes, if needed. The aGenericOrder object now has one or more associated policy objects that it may query or delegate to during the processing of an order.

Figure 6:
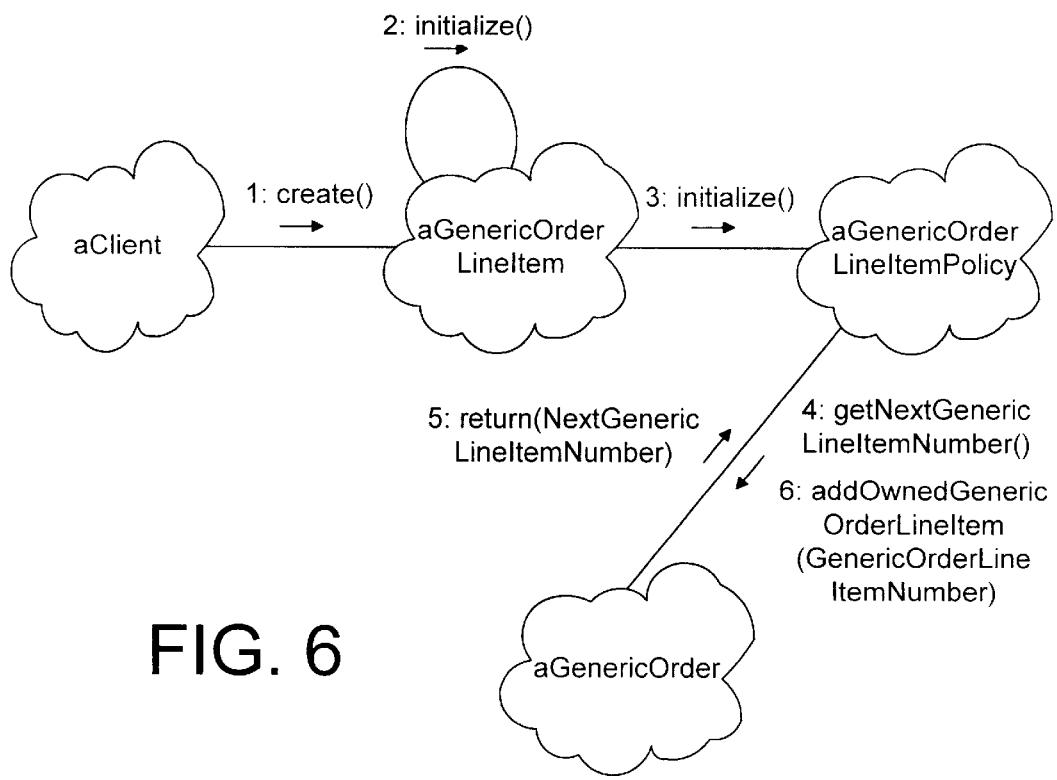
FIG. 6 is an object diagram showing the steps in adding line items to a generic order object.

The object diagram of FIG. 6 illustrates the steps in building a GenericOrder by adding line items to the GenericOrder object. First, a client program or object invokes the create( ) constructor on the GenericOrderLineItem class (step 1), which causes an instance aGenericOrderLineItem to be created. Next, this instance is initialized (step 2). Note that information may be passed as parameters in both of steps 1 and 2, which govern the attributes of the aGenericOrderLineItem object. Next, one or more corresponding policy objects are created or retrieved, and then initialized (step 3). The policy object then queries the corresponding order object aGenericOrder by invoking its getNextGenericLineItemNumber( ) method (step 4), which causes the aGenericOrder object to return the next available line item number in the object (step 5). The policy class then invokes the addOwnedGenericOrderLineItem( ) method on the aGenericOrder object, passing the GenericOrderLineItemNumber returned in step 5 as a parameter (step 6). This step adds the aGenericOrderLineItem object to the aGenericOrder object. Note that steps 4–6 are repeated as required until the aGenericOrder object has all the line items it needs to represent the order that is being constructed.

Figure 7:
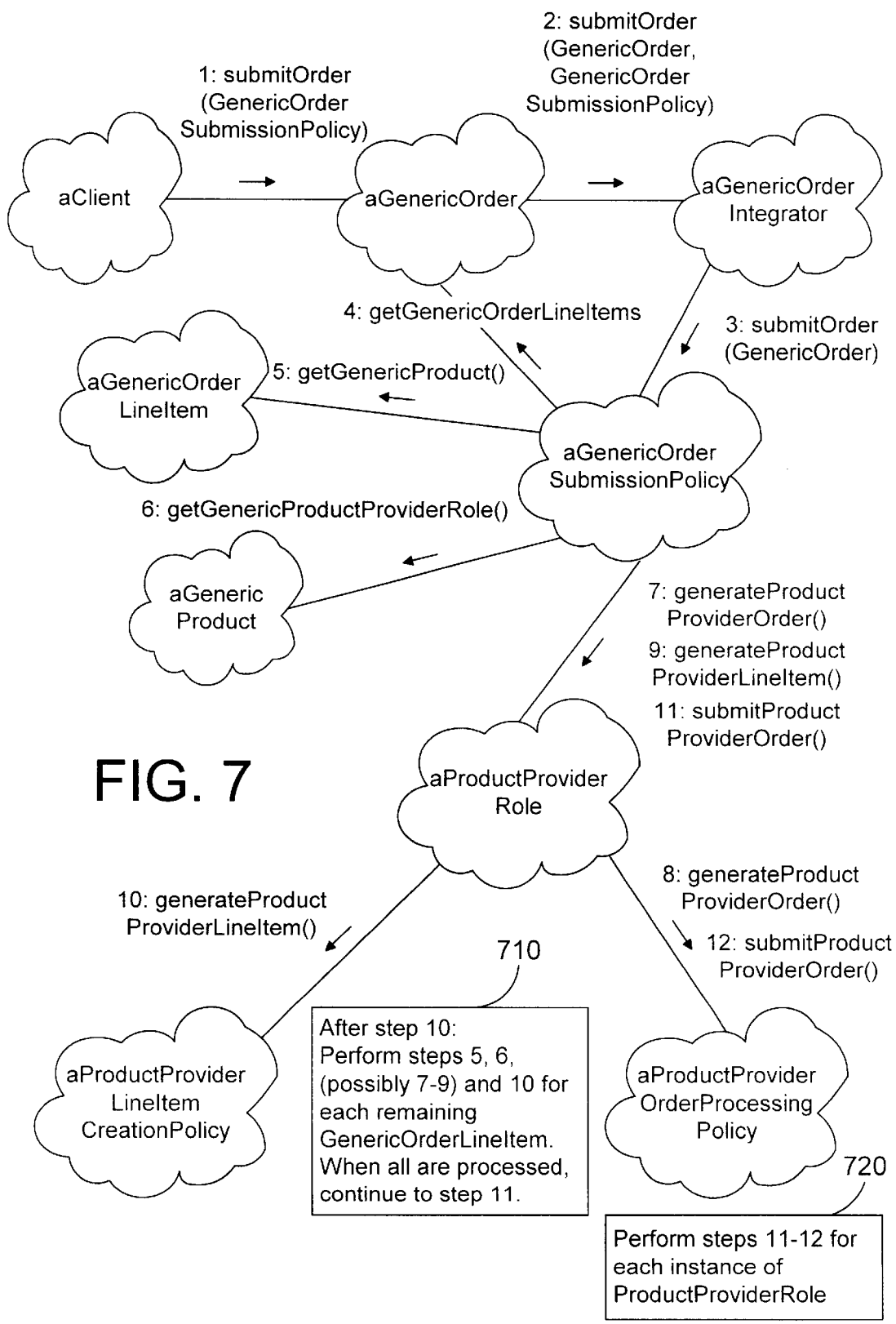
FIG. 7 is an object diagram illustrating a method for processing an order and submitting requests to multiple order fulfillment systems in accordance with one specific implementation of the preferred embodiments.

FIG. 7 is an object diagram that illustrates the steps in processing an order in accordance with the preferred embodiments for the specific example implementation in FIGS. 3 and 4. A client program or object invokes the submitOrder( ) method on the aGenericObject object, passing a relevant policy as a parameter (step 1). In response, the aGenericObject invokes the submitOrder( ) method on the aGenericOrderIntegrator object, passing the generic order object and relevant policy as parameters (step 2). Next, the aGenericOrderIntegrator object invokes the submitOrder( ) method on the relevant policy class (aGenericOrderSubmissionPolicy) that was passed to it in step 2 (step 3). The aGenericOrderSubmissionPolicy object then calls the getGenericOrderLineItems( ) method on the aGenericOrder object (step 4), which returns a list of line items in the generic order. Next, one of the line items is selected, and the aGenericOrderSubmissionPolicy object invokes the getGenericProduct( ) method on the selected aGenericOrderLineItem object (step 5). In response, the aGenericOrderLineItem object returns the GenericProduct instance that corresponds to that line item. The aGenericOrderSubmissionPolicy then invokes the getGenericProductRole( ) method on the GenericProduct instance returned in response to step 5 (step 6) to determine the ProductProviderRole instance that corresponds to the GenericProduct instance. At this point the aGenericOrderSubmissionPolicy object has all the information it needs to submit an order, so it then calls the generateProductProviderorder( ) method on the ProductProviderRole instance that was returned in response to step 6 (step 7). In response, the aProductProviderRole object invokes the generateProductProviderorder( ) method on the relevant policy class for processing the order (step 8). This method causes an order that can be submitted to a fulfillment system that can supply the GenericProduct to be created. Next, a line item in that order is created by the aGenericOrderSubmissionPolicy invoking the generateProductProviderLineItem( ) method on the aProductProviderRole object (step 9). In response, the aProductProviderRole object invokes the generateProductProviderLineItem( ) method on the appropriate policy that controls how line items are created for an order that corresponds to the aGenericProduct object (step 10). At this point steps 5–6, possibly 7–9 (based upon new ProductProviderRole instances being discovered during processing), and 10 are repeated for each remaining GenericOrderLineItem that was returned in response to step 4, as noted in box 710 in FIG. 7. Note that these steps create one or more orders for submission to one or more order fulfillment systems. Let's assume that a customer has ordered five items (which correspond to line items), with the first three line items being supplied from one source, the fourth line item being supplied from a second source, and the fifth line item being supplied from a third source. Performing steps 5–10 for each line item results in one order for the first source being constructed with three line items that correspond to the first three line items in the GenericOrder, a second order for the second source being constructed with one line item that corresponds to the fourth line item in the GenericOrder, and a third order for the third source being constructed with one line item that corresponds to the fifth line item in the GenericOrder. Once these orders are constructed, they are then submitted to their respective order fulfillment systems.

An order is submitted to its order fulfillment system by the aGenericOrderSubmissionPolicy invoking the submitProductProviderOrder( ) method on the aProductProviderRole object (step 11), which in turn invokes the submitProductProviderOrder( ) method on the relevant order processing policy (step 12). Steps 11 and 12 are repeated for each instance of ProductProviderRole that was created in steps 5–10, as stated in box 720 of FIG. 7. For our example above with a generic order that has five line items from three different product providers, there will be three different ProductProviderRole instances, each corresponding to the three orders for the product providers that were generated in steps 7–9. Repeating steps 11 and 12 for each of these three ProductProviderRole object results in submitting the three orders to the three different order fulfillment systems.

Figure 8:
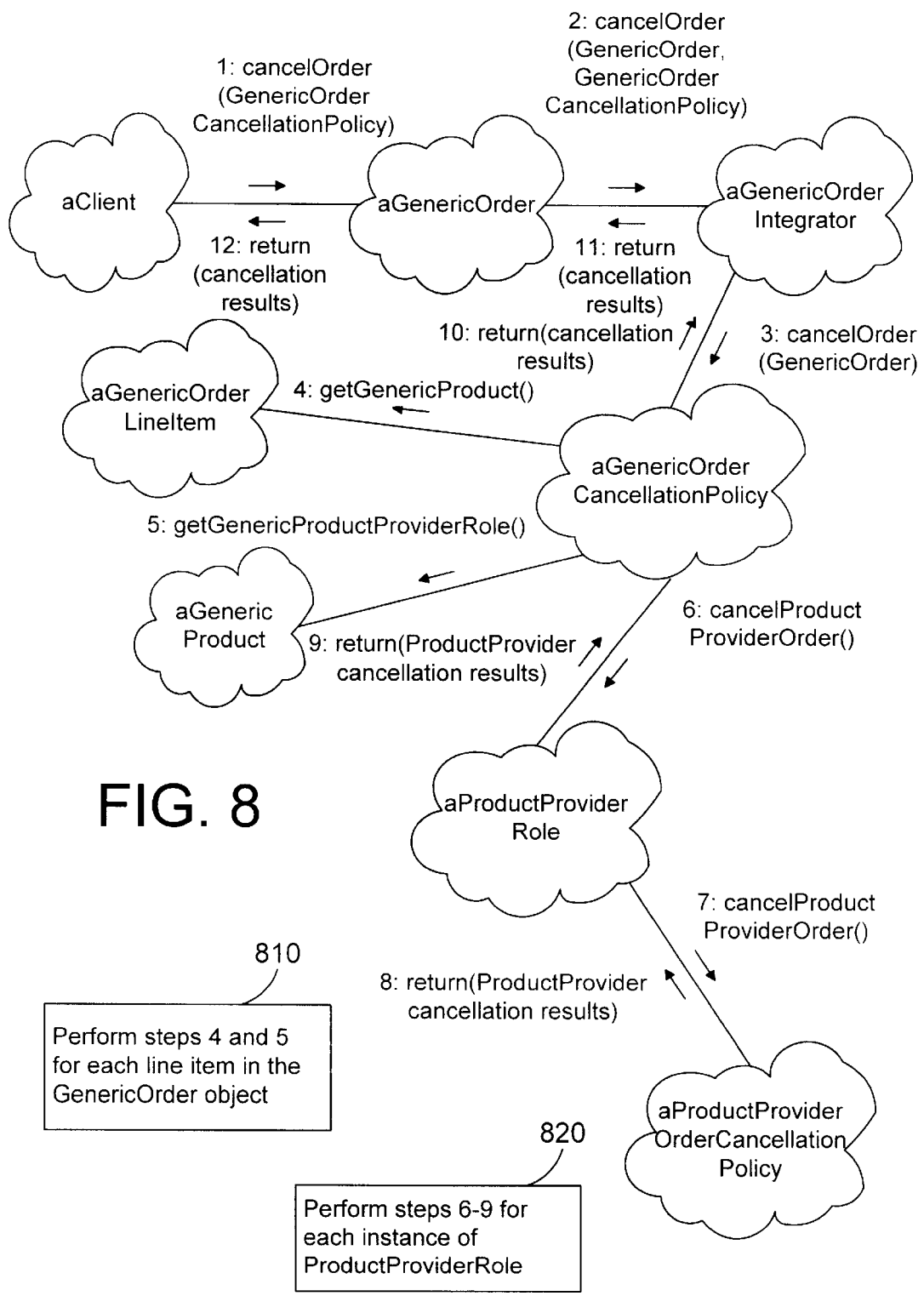
FIG. 8 is an object diagram of a method for canceling a previously-submitted order in accordance with one specific implementation of the preferred embodiments.

Once a generic order has been processed, and one or more requests have been created for one or more fulfillment systems to fill the order, and these requests have been submitted to the appropriate order fulfillment systems, it may be necessary in some circumstances to cancel an order. As shown in FIG. 8, the steps in canceling an order are similar to the steps in processing an order, and can therefore be implemented within the framework 125. First, a client program or object invokes the cancelOrder( ) method on the aGenericOrder object that corresponds to the order to be canceled (step 1). In response, the aGenericOrder object calls the cancelOrder( ) method on the aGenericOrderIntegrator object, passing the GenericOrder and cancellation policy as parameters (step 2). The aGenericOrderIntegrator object in turn invokes the cancelOrder( ) method on the relevant policy object that was passed in the method call of step 2 (step 3). The policy then invokes the getGenericProduct( ) method on the first line item in the generic order (step 4). The line item object then returns to the policy object the GenericProduct instance that corresponds to the line item object. The policy object then invokes the getGenericProductProviderRole( ) method on the GenericProduct instance returned in response to step 4 (step 5), which returns the ProductProviderRole instance that corresponds to the aGenericProduct instance. Note that steps 4 and 5 are repeated for each line item in the aGenericOrder object, as stated in box 810 of FIG. 8. The policy object then invokes the cancelProductProviderOrder() method on the aProductProviderRole object (step 6), which in turn generates a cancelProductProviderOrder( ) method on an appropriate policy object that controls how an order is canceled (step 7). The policy object then performs the steps necessary to cancel this previously-submitted order, and returns the results of the attempted cancellation (step 8), which is returned to the policy object (step 9). The product provider cancellation results (steps 8 and 9) indicate whether the order was canceled or not. Note that steps 6–9 are repeated for each instance of ProductProviderRole, as stated in box 820 of FIG. 8. For our example above with a generic order that has five line items from three different product providers, there will be three different ProductProviderRole instances identified in steps 4 and 5. Repeating steps 6 through 9 for each of these three ProductProviderRole object results in canceling the three previously-submitted orders to the three different order fulfillment systems. The policy object collects the results of canceling each order to each order fulfillment system, then ripples the results to the client in steps 10–12. Note that the overall cancellation results can only indicate that the cancellation was successful if each and every order that made up the GenericOrder was successfully canceled. Once the client receives the cancellation results, the client can then take appropriate action depending on whether or not the order was successfully canceled.

Note that the examples presented herein are extremely simplified to illustrate some of the pertinent aspects of the framework of the present invention. Many changes, variations, and enhancements to the embodiments herein are possible within the scope of the present invention. For example, framework 125 could provide different ways to submit and cancel orders, such as specifying that the operation is synchronous or asynchronous. If an order is submitted synchronously, this means that the client must await confirmation of the order. If an order is submitted asynchronously, the client may check the status of the order later on, but may continue to work on other tasks while the order is processed. In similar fashion an order cancellation could be performed synchronously or asynchronously. In addition, many other classes and objects may be included in framework 125 within the scope of the preferred embodiments. Furthermore, the submission and cancellation of an order are described herein as examples of functions that could be readily implemented within a framework, and other functions relating to order processing are expressly within the scope of the preferred embodiments. The present invention expressly extends to any and all implementations that define a generic order, and that process the generic order and automatically generate one or more requests to one or more order fulfillment systems in their proper order entry protocols.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor;
   at least one order fulfillment system residing in the memory, each order fulfillment system having an interface for receiving an order using a predefined protocol; and
   an object oriented framework mechanism residing in the memory and executed by the at least one processor, the framework mechanism comprising:
      at least one object oriented generic order class that cannot be modified by a user, the generic order class defining at least one generic order object; and
      at least one interface class that is extensible by a user, the interface class defining at least one interface object that processes the at least one generic order object and generates therefrom at least one request to the at least one order fulfillment system that satisfies the predefined protocol for each order fulfillment system.

2. The apparatus of claim 1 wherein the at least one order fulfillment system comprises a plurality of order fulfillment systems that each have a different predefined protocol for receiving an order, wherein the framework mechanism processes the generic order object and generates therefrom a request to each of a plurality of the order fulfillment systems in a predefined protocol that corresponds to the order fulfillment system.

3. The apparatus of claim 1 wherein the generic order object includes a plurality of order line item objects, and wherein the at least one interface object processes each of the plurality of order line item objects and generates at least one request for each of the plurality of order line item objects.

4. The apparatus of claim 1 wherein the at least one interface class comprises a product provider role class that defines a plurality of object methods that generate an order and that generate an order line item in the order in the predefined protocol for the corresponding order fulfillment system.

5. The apparatus of claim 1 wherein the framework mechanism comprises at least one policy class that defines extensible functions of the framework mechanism.

6. An apparatus comprising:
   an object oriented framework mechanism residing on a first computer system coupled via a network to a plurality of order fulfillment systems each residing on a different computer system, each order fulfillment system having an interface for receiving an order using a predefined protocol, the framework mechanism comprising:
      at least one object oriented generic order class that cannot be modified by a user, the generic order class defining at least one generic order object, each generic order object comprising a plurality of order line item objects; and
      at least one interface class that is extensible by a user, the interface class defining at least one interface object that processes the at least one generic order object and generates for each order line item object in the generic order object a request to the plurality of order fulfillment systems, each request satisfying the predefined protocol for the corresponding order fulfillment system.

7. A method for processing an order, the method comprising the steps of:
   (1) providing an object oriented framework mechanism comprising:
      (1A) at least one object oriented generic order class that cannot be modified by a user, the generic order class defining at least one generic order object; and
      (1B) at least one interface class that is extensible by a user, the interface class defining at least one interface object that processes the at least one generic order object and generates therefrom at least one request to at least one order fulfillment system that satisfies the predefined protocol for each order fulfillment system;
   (2) extending the at least one interface class to define the predefined protocol for each order fulfillment system;
   (3) entering an order into a generic order object;
   (4) the framework processing the order, and generating therefrom at least one request to at least one order fulfillment system.

8. The method of claim 7 wherein the at least one order fulfillment system comprises a plurality of order fulfillment systems that each have a different predefined protocol for receiving an order, wherein the framework mechanism processes the generic order object and generates therefrom a request to each of a plurality of the order fulfillment systems in a predefined protocol that corresponds to the order fulfillment system.

9. The method of claim 7 wherein the generic order object includes a plurality of order line item objects, and wherein the at least one interface object processes each of the plurality of order line item objects and generates at least one request for each of the plurality of order line item objects.

10. The method of claim 7 further comprising the steps of:
    generating from the extended framework mechanism an executable framework application; and
    executing the executable framework application, wherein steps 3 and 4 are performed by the executing framework application.

11. The method of claim 7 further comprising the step of extending additional extensible classes in the framework mechanism to at least partially define user-specified functions in the framework mechanism.

12. A method for processing an order, the method comprising the steps of:
    (1) providing an object oriented framework mechanism residing on a first computer system coupled via a network to a plurality of order fulfillment systems each residing on a different computer system, each order fulfillment system having an interface for receiving an order using a predefined protocol, the framework mechanism comprising:
        (1A) at least one object oriented generic order class that cannot be modified by a user, the generic order class defining at least one generic order object, each generic order object comprising a plurality of order line item objects; and
        (1B) at least one interface class that is extensible by a user, the interface class defining at least one interface object that processes the at least one generic order object and generates for each order line item object in the generic order object a request to the plurality of order fulfillment systems, each request satisfying the predefined protocol for the corresponding order fulfillment system;
    (2) extending the at least one interface class to define the predefined protocol for each order fulfillment system;
    (3) generating from the extended framework mechanism an executable framework application;
    (4) executing the executable framework application;
    (5) entering an order into a generic order object;
    (6) the executing framework application processing the order; and
    (7) the executing framework application generating from the processed order a request to a plurality of order fulfillment systems.

13. A program product comprising:
    (1) an object oriented framework mechanism comprising:
        at least one object oriented generic order class that cannot be modified by a user, the generic order class defining at least one generic order object; and
        at least one interface class that is extensible by a user, the interface class defining at least one interface object that processes the at least one generic order object and generates therefrom at least one request to at least one order fulfillment system that satisfies the predefined protocol for each order fulfillment system; and
    (2) signal bearing media bearing the framework mechanism.

14. The program product of claim 13 wherein said signal bearing media comprises recordable media.

15. The program product of claim 13 wherein said signal bearing media comprises transmission media.

16. The program product of claim 13 wherein the at least one order fulfillment system comprises a plurality of order fulfillment systems that each have a different predefined protocol for receiving an order, wherein the framework mechanism processes the generic order object and generates therefrom a request to each of a plurality of the order fulfillment systems in a predefined protocol that corresponds to the order fulfillment system.

17. The program product of claim 13 wherein the generic order object includes a plurality of order line item objects, and wherein the at least one interface object processes each of the plurality of order line item objects and generates at least one request for each of the plurality of order line item objects.

18. The program product of claim 13 wherein the at least one interface class comprises a product provider role class that defines a plurality of object methods that generate an order and that generate an order line item in the order in the predefined protocol for the corresponding order fulfillment system.

19. The program product of claim 13 wherein the framework mechanism comprises at least one policy class that defines extensible functions of the framework mechanism.

* * * * *